United States Patent
Mazurek et al.

(10) Patent No.: US 6,838,150 B2
(45) Date of Patent: *Jan. 4, 2005

(54) PRESSURE-SENSITIVE ADHESIVES HAVING MICROSTRUCTURED SURFACES

(75) Inventors: Mieczyslaw H. Mazurek, Roseville, MN (US); Robert K. Galkiewicz, Roseville, MN (US); Gerald M. Benson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 11 days.

This patent is subject to a terminal disclaimer.

(21) Appl. No.: 10/228,015

(22) Filed: Aug. 26, 2002

(65) Prior Publication Data

US 2003/0082371 A1 May 1, 2003

Related U.S. Application Data

(63) Continuation of application No. 09/432,944, filed on Nov. 3, 1999, now Pat. No. 6,440,880, which is a continuation of application No. 08/892,757, filed on Jul. 15, 1997, now Pat. No. 6,123,890, which is a division of application No. 08/436,021, filed on May 5, 1995, now Pat. No. 5,650,215, which is a continuation of application No. 08/145,423, filed on Oct. 29, 1993, now abandoned.

(51) Int. Cl.⁷ .............................................. D04H 7/04
(52) U.S. Cl. ................ 428/141; 442/149; 442/150; 442/151; 428/41.7; 428/41.8; 428/42.1; 428/42.3; 428/60; 428/103; 428/156; 428/343; 428/346; 428/347; 428/352; 428/355 RA

(58) Field of Search ................... 442/149, 150, 442/151; 428/41.7, 41.8, 42.1, 42.3, 60, 103, 141, 156, 195, 200, 201, 203, 212, 213, 214, 220, 343, 346, 347, 355 RA

(56) References Cited

U.S. PATENT DOCUMENTS

| 4,340,276 A | * | 7/1982 | Maffitt et al. ............... 359/581 |
| 4,576,850 A | * | 3/1986 | Martens ..................... 428/156 |
| 5,296,277 A | * | 3/1994 | Wilson et al. ............. 428/40.2 |
| 5,362,516 A | * | 11/1994 | Wilson et al. ........... 427/207.1 |
| 5,538,674 A | * | 7/1996 | Nisper et al. .............. 264/1.31 |
| 5,650,215 A | * | 7/1997 | Mazurek et al. ............ 428/156 |
| 5,795,636 A | * | 8/1998 | Keller et al. .............. 428/40.1 |
| 6,123,890 A | * | 9/2000 | Mazurek et al. ............ 264/293 |
| 6,315,851 B1 | * | 11/2001 | Mazurek et al. ............ 156/232 |
| 6,440,880 B2 | * | 8/2002 | Mazurek et al. ............ 442/151 |

FOREIGN PATENT DOCUMENTS

JP          63-193982       8/1988

* cited by examiner

*Primary Examiner*—Arti R. Singh
(74) *Attorney, Agent, or Firm*—Colene H. Blank

(57) ABSTRACT

The invention provides pressure-sensitive adhesive (PSA) coated articles, including tapes and transfer coatings, having microstructured surfaces and methods of making pressure-sensitive adhesive articles bearing such microstructured surfaces. The performance properties of the pressure-sensitive adhesive articles can be tailored by independently varying the microstructure and the rheological properties of the pressure-sensitive adhesive.

20 Claims, 6 Drawing Sheets

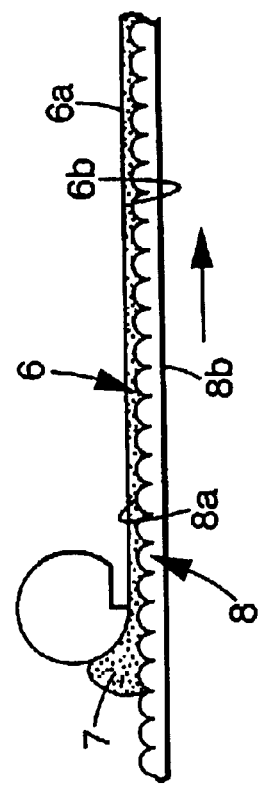
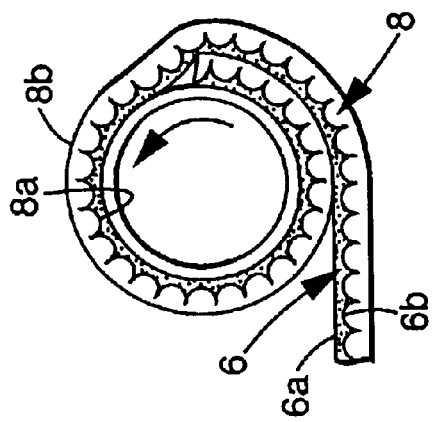
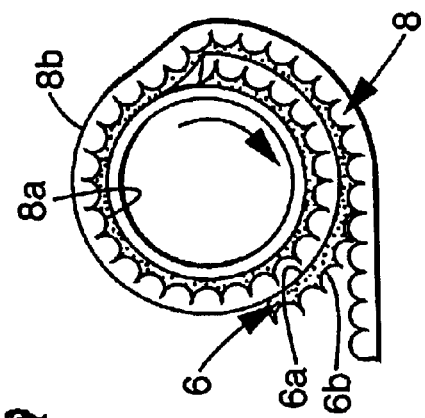

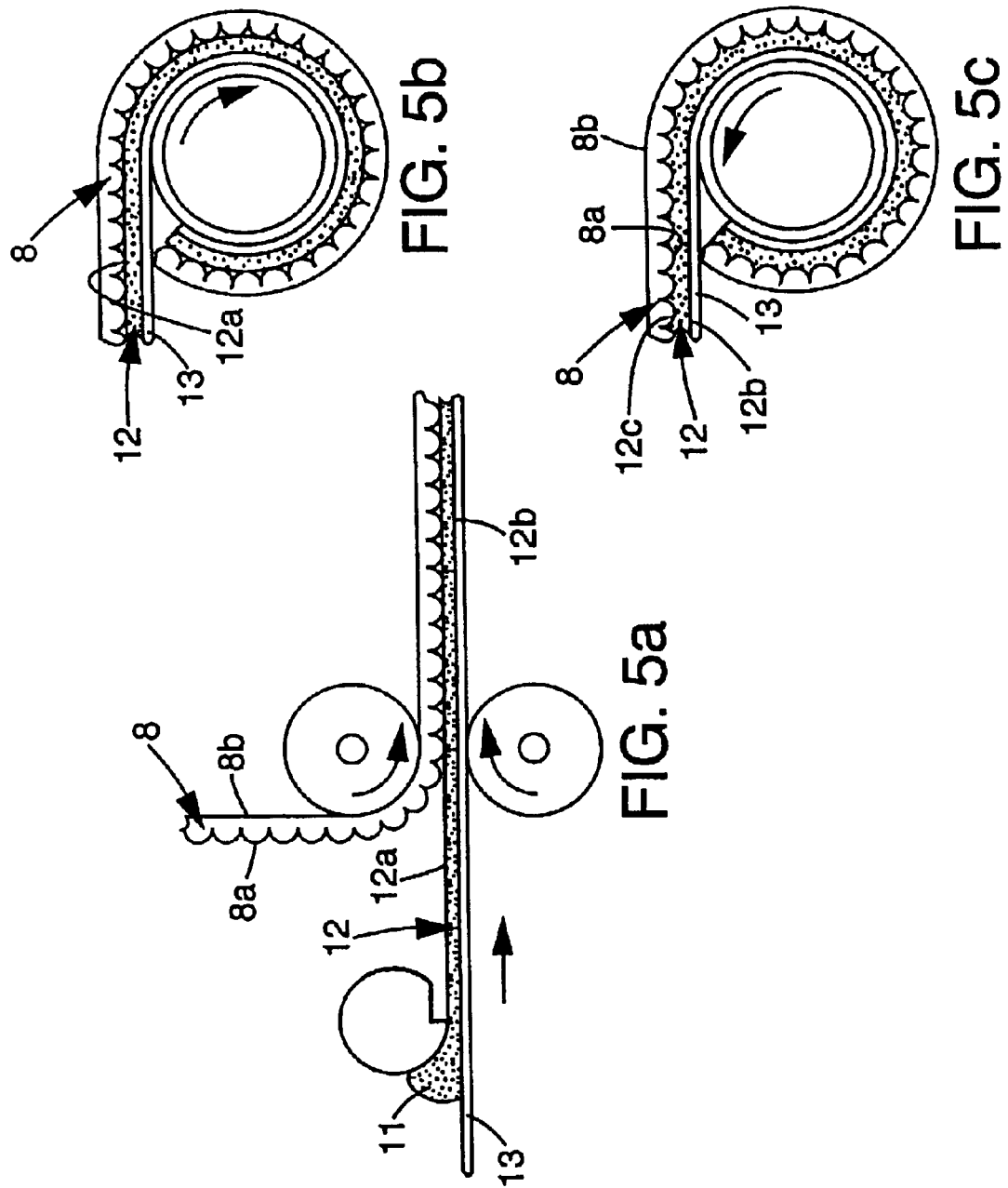

PRESSURE-SENSITIVE ADHESIVES HAVING MICROSTRUCTURED SURFACES

This application is a continuation of U.S. application Ser. No. 09/432,944, field Nov. 3, 1999, issued as U.S. Pat. No. 6,440,880, which is a continuation of U.S. application Ser. No. 08/892,757, filed Jul. 15, 1997, issued as U.S. Pat. No. 6,123,890, which is a divisional of application Ser. No. 08/436,021, filed May 5, 1995, issued as U.S. Pat. No. 5,650,215, which is a continuation of application Ser. No. 08/145,423, filed Oct. 29, 1993 (abandoned).

FIELD OF THE INVENTION

The invention relates to pressure-sensitive adhesive (PSA) coated articles, including tapes and transfer coatings, having microstructured surfaces and methods of making pressure-sensitive adhesive articles bearing such microstructured surfaces. The performance properties of the pressure-sensitive adhesive articles can be tailored by independently varying the microstructure and the rheological properties of the pressure-sensitive adhesive.

BACKGROUND OF THE INVENTION

Repositionable pressure-sensitive adhesives, adhesives which predictably adhere to, yet remain repeatedly peelable from, a variety of target substrates over a long period of time without damaging or marring the substrate, have many commercial uses. For example, masking tapes, removable labels or office notes, protective films and medical tapes all must quickly adhere to metal, paper, plastics and skin, respectively, but must also peel smoothly away from these varied target substrates without leaving behind any adhesive residue on or harming the surface of a particular target substrate.

Several approaches have been explored in preparing and formulating repositionable adhesives. One means for providing a repositionable adhesive is through the reduction of the adhesive contact area and can be accomplished by the deposition of a discontinuous or patterned film on a backing. PCT International Appl. WO 85/04602 (Newing et al.) describes pressure-sensitive adhesive articles comprising a plurality of discontinuous adhesive segments in a pattern on at least a portion of at least one side of a carrier or backing, covering from about ten to about thirty percent of the total surface area of that carrier material. These segments have an average height of from about 15 to about 35 microns and are about 50 to about 400 microns in width. The pressure-sensitive adhesive coating used must have, according to American Society of Testing Materials (ASTM) D-3330-81, a 180° peel of from about 0.5 to about 2.0 pound per inch (8.75 to 35 N/dm) when such adhesive is coated and evaluated as specified by this standard. Finally, the teachings of Newing et al. explicitly state that, ". . . running together of the applied adhesive is to be avoided at all times . . . ", as such a coalescence or coating continuity will hinder the repositionability of these adhesives.

U.S. Pat. No. 4,587,152 (Gleichenhagen et al.) describes a redetachable contact-adhesive sheet-like structure prepared by the printing of a regular discontinuous pattern of calotte-shaped (cap of sphere shaped) bonding sites up to 600 microns in diameter at their base on a backing or carrier, such bonding sites comprising an adhesive having a sufficiently high structural viscosity and thixotropy to maintain their calotte shape. Gleichenhagen et al. also teach that the adhesive properties of the claimed redetachable sheet can be altered through the variation of the height, the geometrical distribution, the frequency, and the basal diameter of the calottes. It is further asserted that the adhesive properties may be varied through controlling the viscoelastic properties of the adhesive used (i.e., adhesive ranging, ". . . from very soft, highly tacky and of low shearing strength to hard, slightly tacky and of high shearing strength."). These rheological properties may be further enhanced or controlled through crosslinking the adhesive by heat or irradiation.

U.S. Pat. No. 5,194,299 (Fry) describes a repositionable pressure-sensitive sheet material comprising a sheet material bearing on one surface a discontinuous non-repetitive adhesive coating covering about 10 to about 85 percent of the surface in the form of individual adhesive islands. These islands, applied via spray coating techniques, range from about 10 to about 150 microns in height and from about 20 to about 500 microns in diameter at their bases and are comprised of a pressure-sensitive adhesive composition that, when coated continuously to a sheet material by conventional means, would not remove cleanly from a paper substrate or adherend. Fry also recognizes that the peel characteristics of the claimed sheet material may be varied by controlling the population density of the adhesive islands in the discontinuous coatings and/or the inherent tackiness of the adhesive selected for spray coating.

U.S. Pat. No. 4,889,234 (Sorenson et al.) discloses a discontinuous patterned adhesive label structure in which the level of adhesion is varied according to area of adhesive coverage on the label, the pattern in which the adhesive is coated, and the full coverage adhesive characteristics of the materials used. These variables may be adjusted independently within a single label structure, resulting in the capability to design differential peel forces at specified portions of the label. Sorenson et al. teach the criticality of selecting the adhesive material useful in the claimed structures according to their 100% coverage (i.e., continuous coating) peel force, a quantity which ranges from approximately 0.7 pound per inch (12.75 N/dm) for a solvent-type removable adhesive to approximately 6 pounds per inch (105 N/dm) for a solvent-based high strength adhesive in a 90° peel test from a stainless steel substrate. As a point of reference in this disclosure, pressure-sensitive materials that are removable as continuous, 100% coverage coatings, as specified by the Pressure Sensitive Tape Council, have a peel force of about 2 pounds per inch (35 N/dm) or less.

Yet another approach to providing a permanently repositionable pressure-sensitive adhesive involves the use of crosslinking of a continuous, planer coating to reduce the tack and control the wetting or flow of the adhesive over the long term. U.S. Pat. No. 4,599,265 (Esmay) discloses a low tack, acrylate, removable pressure-sensitive adhesive tape which maintains peelability from a variety of ordinary target substrates. Esmay teaches that through the photocrosslinking of the tape's adhesive layer and the use of low levels of polar monomer (up to 3% by weight of a strongly polar monomer, such as acrylic acid) along with alkyl acrylates having side chains 8–12 carbons in length in the copolymeric adhesive, the required balance of low tack, minimal adhesion buildup, and high cohesive strength can be imparted to the removable adhesive.

U.S. Pat. No. 4,693,935 (Mazurek) discloses a continuous pressure-sensitive adhesive coating composition comprising a copolymer having a vinyl polymeric backbone having grafted thereto polysiloxane moieties. An exposed surface of the PSA coating is initially positionable on a target substrate to which it will be adhered to but, once adhered, builds adhesion to form a strong bond.

European Patent Appl. 279,579 B1 (Tanuma et al.) describes pressure-sensitive adhesive sheets comprising, in one embodiment, a continuous adhesive layer "having a macroscopically non-uniform adhesion face". These pressure-sensitive adhesive constructions, formulated to exhibit both initial and long term repositionability on a variety of target substrates, attain these removable characteristics through a combination of the partial contact between adhesive layer and adherend caused by this uneven adhesive layer and through the introduction of a crosslinking structure to the adhesive to limit the adhesion build up resulting from the fluidity or flow of the adhesive over the long term. The uneven adhesive layer, according to the application, is imparted through a variety of pressing, molding, and embossing methods.

SUMMARY OF THE INVENTION

A need thus exists for a continuously coated, unfilled, microstructured pressure-sensitive adhesive article which exhibits initial repositionability when adhered to a variety of target substrates and, through the independent variation and selection of microstructured pattern and the chemical nature and Theological properties of the microstructured pressure-sensitive adhesive, displays reduced, constant or increased long-term adhesion as required by the intended application.

A need further exists for methods of preparing such microstructured pressure-sensitive adhesive articles.

The present invention relates to an article, including adhesive tapes and transfer coatings, bearing a continuous pressure-sensitive adhesive layer having a microstructured surface wherein the microstructured surface comprises a series of, features and wherein the lateral aspect ratio of the features range from about 0.1 to about 10. At least two of the feature dimensions (height, width and length) must be microscopic. All three of the feature dimensions (height, width, length) may be microscopic. The microstructured patterned adhesive exhibits initial repositionability when adhered to a variety of target substrates and, through the independent variation and selection of microstructured pattern and the chemical nature and Theological properties of the microstructured pressure-sensitive adhesive, displays reduced, constant, or increased long-term adhesion as required by the intended application.

Another aspect of the present invention relates to a first method of making a microstructured pressure-sensitive adhesive tape comprising the steps of:
(a) providing a microstructured molding tool;
(b) embossing an adhesive layer of an adhesive tape comprising a backing coated with a continuous layer of an embossable pressure-sensitive adhesive with the microstructured molding tool, wherein the pressure-sensitive adhesive layer is capable of assuming the pattern of the microstructured molding tool and retaining a microstructured surface upon removal from the microstructured molding tool; and
(c) separating the microstructured molding tool from the adhesive layer to form a microstructured pressure-sensitive adhesive tape.

Another aspect of the present invention relates to a second method of making a microstructured pressure-sensitive adhesive tape comprising the steps of:
(a) providing a microstructured molding tool;
(b) coating a pressure-sensitive adhesive layer against the microstructured molding tool, wherein the pressure-sensitive adhesive layer is capable of assuming the pattern of the microstructured molding tool and retaining the microstructured pattern upon removal from the microstructured molding tool;

(c) applying a backing to the surface of the pressure-sensitive adhesive layer which is in contact with the microstructured molding tool; and
(d) separating the microstructured molding tool and the adhesive layer to form a microstructured pressure-sensitive adhesive tape.

Another aspect of the present invention relates to a third method for making a microstructured pressure-sensitive adhesive tape comprising the steps of:
(a) providing a microstructured backing having a pressure-sensitive adhesive releasing microstructured side and a planar side having less release character than the microstructured side;
(b) coating a pressure-sensitive adhesive layer on the microstructured side of the backing;
(c) adhering the surface of the pressure-sensitive adhesive layer which is in contact with the microstructured backing to the planar side of the microstructured backing; and
(d) removing the microstructured side of the backing from the microstructured surface of the adhesive layer to form a microstructured pressure-sensitive adhesive tape.

Another aspect of the present invention relates to a fourth method for making a microstructured pressure-sensitive adhesive tape comprising the steps of:
(a) providing a microstructured backing having a pressure-sensitive adhesive releasing microstructured side and a planar side having less release character than the microstructured side;
(b) coating an embossable pressure-sensitive adhesive layer on the planar side of the backing;
(c) contacting the surface of the pressure-sensitive adhesive layer which is in contact with the microstructured backing with the microstructured side of the backing to emboss the adhesive layer; and
(d) separating the microstructured backing and the adhesive layer to yield a microstructured pressure sensitive adhesive tape.

Another aspect of the present invention relates to a first method of making a microstructured pressure-sensitive adhesive transfer coating comprising the steps of:
(a) providing a microstructured molding tool;
(b) embossing an adhesive layer of an adhesive transfer coating comprising a release liner coated with a continuous layer of an embossable pressure-sensitive adhesive with the microstructured molding tool, wherein the pressure-sensitive adhesive layer is capable of assuming the pattern of the microstructured molding tool and retaining a microstructured surface upon removal from the microstructured molding tool; and
(c) separating the microstructured molding tool and the transfer coating to form a microstructured pressure-sensitive adhesive transfer coating.

Another aspect of the present invention relates to a second method of making a microstructured pressure-sensitive adhesive transfer coating comprising the steps of:
(a) providing a microstructured molding tool;
(b) coating a pressure-sensitive adhesive layer against the microstructured molding tool, wherein the pressure-sensitive adhesive layer is capable of assuming the pattern of the microstructured molding tool and retaining the microstructured pattern upon removal of the microstructured molding tool;
(c) applying a release liner to the surface of the pressure-sensitive adhesive layer which is in contact with the microstructured molding tool; and (d) separating the microstructured molding tool and the adhesive layer to form a microstructured pressure-sensitive adhesive transfer coating.

Another aspect of the present invention relates to a third method of making a microstructured pressure-sensitive adhesive transfer coating comprising the steps of:

(a) providing a first release liner coated with a continuous layer of an embossable pressure-sensitive adhesive; and (b) embossing the surface of the pressure-sensitive adhesive layer which is in contact with the first release liner with a microstructured second release liner to form a microstructured pressure-sensitive adhesive transfer coating.

Another aspect of the present invention relates to a fourth method of making a microstructured pressure-sensitive adhesive transfer coating comprising the steps of:

(a) providing a microstructured liner having a microstructured side and a planar side, both sides having release characteristics;

(b) coating a pressure-sensitive adhesive layer on the microstructured side of the liner;

(c) adhering the surface of the pressure-sensitive adhesive layer which is not in contact with the microstructured liner to the planar side of the microstructured liner; and (d) removing both the microstructured side and planar side of the liner from the adhesive layer to form a microstructure pressure-sensitive adhesive transfer coating.

Definitions

The following terms are used herein.

As used herein, the term "microscopic" refers to features of small enough dimension so as to require an optic aid to the naked eye when viewed from any plane of view to determine its shape. One criterion is found in *Modern Optic Engineering* by W. J. Smith, McGraw-Hill, 1966, pages 104–105 whereby visual acuity, ". . . is defined and measured in terms of the angular size of the smallest character that can be recognized." Normal visual acuity is considered to be when the smallest recognizable letter subtends an angular height of 5 minutes of arc on the retina. At at typical working distance of 250 mm (10 inches), this yields a lateral dimension of 0.36 mm (0.0145 inch) for this object.

As used herein, the term "microstructure" means the configuration of features wherein at least 2 dimensions of the features are microscopic. The topical and/or cross-sectional view of the features must be microscopic. The function of the pressure sensitive adhesive article is critically dependent on the form of the microstructure, which may consist of positive and negative features.

As used herein, the term "positive features" means features projecting out of the body of the microstructured molding tool, microstructured liner, microstructured backing, or microstructured pressure-sensitive adhesive layer.

As used herein, the term "negative features" means features projecting into the body of the microstructured molding tool, microstructured liner, microstructured backing, or microstructured pressure-sensitive adhesive layer.

As used herein, the term "embossable" refers to the ability of a pressure-sensitive adhesive layer to have part of its surface raised in relief, especially by mechanical means.

As used herein, the term "wetting" means spreading out over and intimately contacting a surface.

As used herein, the term "dewetting" means contracting from intimate contact with a surface.

As used herein, the term "repositionable adhesives" refers to those adhesives which upon application to a specific target substrate can be removed without causing damage to the substrate and without leaving residue on the substrate and without causing damage to the backing or liner over a range of peel forces.

As used herein, the term "permanently repositionable adhesives" refers to repositionable adhesives for which the of adhesion to a given target substrate does not change substantially with time under application conditions.

As used herein, the term "temporarily repositionable adhesives" refers to those initially repositionable adhesives which build in adhesion with time, pressure or temperature such that they are no longer repositionable.

As used herein, the term "self-debonding adhesives" refers to adhesives which show initial adhesion controlled by the conditions of application (pressure) and a decrease of the adhesion level with time.

As used herein, the term "release liner", used interchangeably with the term "liner", refers to a thin flexible sheet which after being placed in intimate contact with pressure-sensitive adhesive surface may be subsequently removed without damaging the adhesive coating.

As used herein, the term "microstructured liner" refers to a liner with a microstructured surface.

As used herein, the term "backing" refers to a thin, flexible sheet which, after being placed in intimate contact with pressure-sensitive adhesive can not be subsequently removed without damaging adhesive coating.

As used herein, the term "microstructured backing" refers to a backing with a microstructured surface.

As used herein, the term "target substrate" refers to a surface to which the pressure-sensitive adhesive coating is applied for an intended purpose.

As used herein, the term "tape" refers to a pressure-sensitive adhesive coating applied to a backing.

As used herein, the term "transfer coating" refers to a layer of pressure-sensitive adhesive, which is not supported by a backing.

BRIEF DESCRIPTION OF THE DRAWINGS

FIGS. 3a–3c illustrate both a third method of making a pressure-sensitive adhesive tape of the invention and a fourth method of making a pressure-sensitive adhesive transfer coating of the present invention.

FIGS. 5a–5c illustrate a third method of making a pressure-sensitive adhesive transfer coating of the invention.

DETAILED DESCRIPTION OF THE INVENTION

We have discovered that the appropriate combination of microstructured pattern and rheological characteristics of the pressure-sensitive adhesive making up the pressure-sensitive adhesive layers of the tapes and transfer coatings of the present invention provides a means of controlling repositionability characteristics, thus allowing one to make pressure-sensitive adhesive articles which are temporarily repositionable, permanently repositionable, or self-debonding.

In the case of temporarily repositionable pressure-sensitive adhesive tapes and transfer coatings, it is desirable that the microstructured surface of the adhesive article retain its shape until pressure is applied to establish firm contact of a pressure-sensitive coating with a target substrate, or the adhesive layer flows and makes continuous contact with the target substrate due to exposure to heat and/or through inherent surface wetting and Theological properties of the adhesive composition.

In the case of permanently repositionable pressure-sensitive adhesive tapes and transfer coatings, it is desirable that the microstructured surface of the adhesive article retain its shape (i.e., preserves discontinuity of the contact areas with a target substrate) indefinitely at the temperature and pressure range required for a specific application.

In the case of self-debonding pressure-sensitive adhesive tapes and transfer coatings, it is desirable that the microstructured surface of the adhesive article retains its shape indefinitely at the application and the use temperature and pressure and the elasticity recovery forces in the adhesive layer are able to bring about the controlled shape recovery after the adhesive has been pressure-applied to a target substrate.

In terms of pressure-sensitive adhesive compositions, different sets of requirements exist for hot-melt, radiation curable, solvent and water-based adhesives. The only general requirements are that the pressure-sensitive adhesives, as coated, must be able to: assume a microstructured surface as imparted from a microstructured molding tool, backing or liner; retain this surface during the separation of the microstructured molding tool, backing or liner from the pressure-sensitive adhesive; and, retain a microstructured surface as long as required by a specific application.

Methods of Making Microstructured Tapes

Figure 1:
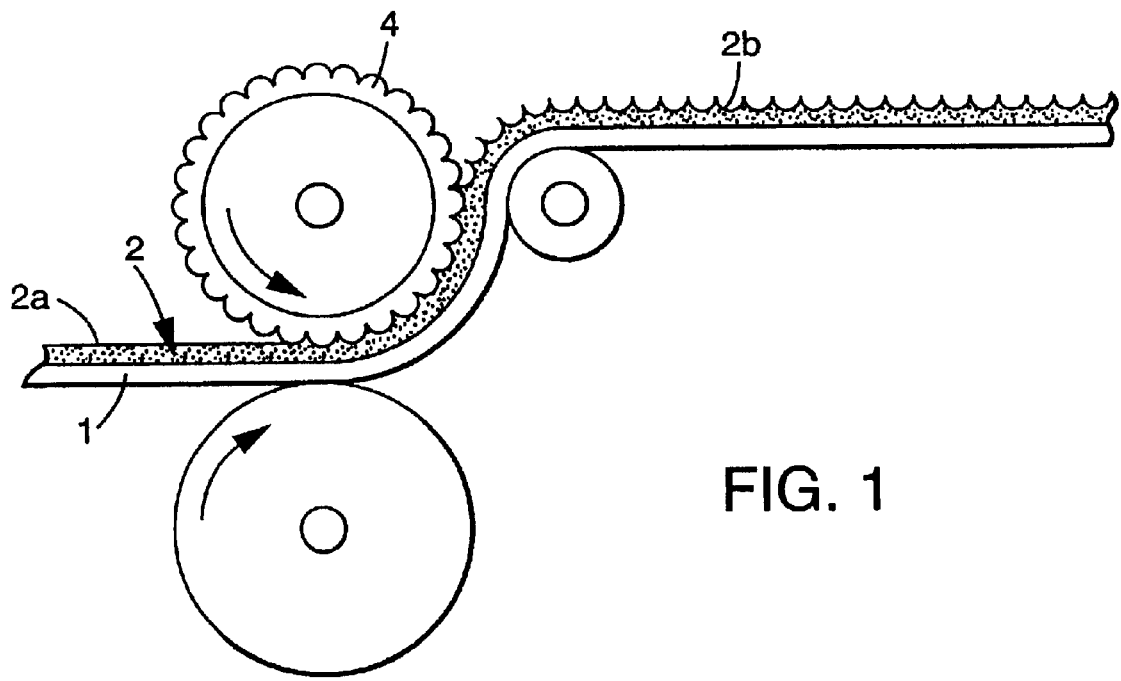
FIG. 1 illustrates both a first method of making a pressure-sensitive adhesive tape of the invention and a first method of making a pressure-sensitive adhesive transfer coating of the present invention.

The first method of the present invention illustrated in FIG. 1 involves the use of a microstructured molding tool [4] to emboss a continuous layer of a pressure-sensitive adhesive [2] having a planer surface [2a] coated on a backing [1]. The thickness of the adhesive layer [2] which is embossed by such microstructured molding tool [4] can vary depending upon the requirement of the final application. The adhesive layer [2] must be thick enough such that after embossing a continuous structured adhesive [2b] must exist. Typically, the adhesive layer [2] is coated at a thickness of about 10 $\mu$m to about 250 $\mu$m, preferably about 25 to about 150 $\mu$m. The microstructured molding tool [4] is applied against the adhesive surface [2a] for a sufficient time and at a sufficient temperature and pressure to impart the desired features to provide a continuous adhesive layer having a microstructured surface [2b] (typically about 0.1 second to about 5 minutes at a temperature of about 20° C. to about 150° C.) depending on the adhesive and microstructure surface desired. The pressure is then discontinued and the sample allowed to cool. The mold is subsequently separated from the adhesive layer yielding a microstructured pressure-sensitive adhesive surface [2b] which substantially replicates the shaping and pattern of the particular microstructured molding tool [4].

Figure 2:
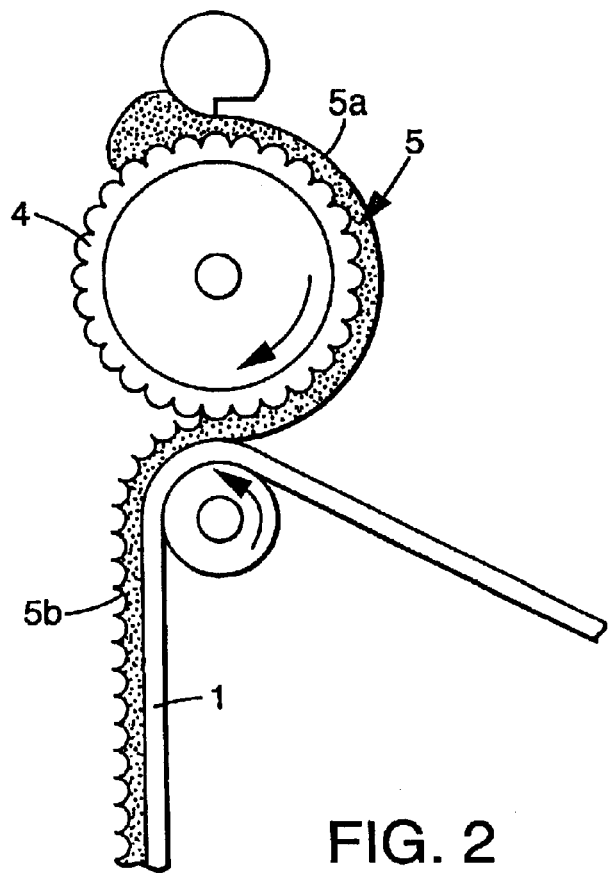
FIG. 2 illustrates both a second method of making a pressure-sensitive adhesive tape of the invention and a second method of making a pressure-sensitive adhesive transfer coating of the present invention.

The second method illustrated by FIG. 2 involves coating or extruding a layer of pressure-sensitive adhesive [5] onto a microstructured molding tool [4]. The surface of the pressure sensitive adhesive layer which does not come into contact with the microstructured molding tool [5a] (i.e., the exposed surface) is then transferred to a substrate [1], which in this case is a backing, to form a microstructured pressure-sensitive adhesive tape. To ensure a clean separation of the adhesive layer [5] from the microstructure molding tool [4], the adhesion of the adhesive surface [5a] to the backing must be greater than the adhesion of the microstructured adhesive surface [5b] to the molding tool [4].

The third method illustrated by FIGS. 3a–3c involves the coating or extruding of a pressure-sensitive adhesive layer [6] from an adhesive reservoir [7] onto a microstructured surface [8a] of a backing [8] which has been previously microstructured on one of its major surfaces. Referring to FIG. 3a, the microstructured surface [8a] of the backing [8] must be capable of releasing the microstructured surface [6b] of the adhesive layer, either via treatment with a low surface energy release coating or through the inherent release characteristics of the microstructured surface [8a] of the backing. Referring to FIG. 3b, the exposed surface of the pressure-sensitive adhesive layer [6a] is then adhered to the non-microstructured (i.e., planar) side [8b] of the backing [8], transferring the adhesive layer [6] to the planar surface [8b] of the backing and revealing the microstructured adhesive surface [6b] as the adhesive layer [6] is separated from the microstructured surface [8a] of the backing (FIG. 3c). This planar backing surface [8b] must have a higher tendency or affinity toward bonding with the planar surface of the adhesive [6a] than the microstructured backing surface [8a] to the microstructured adhesive surface [6b] to facilitate a clean removal and replication of the microstructure in the surface of the microstructured pressure-sensitive adhesive tape. A preferred means for obtaining the final adhesive article according to this method is to wind or roll the initially coated structure upon itself in a convoluted manner (FIG. 3b). The combination of the compressive forces in this tape roll and the greater adhesion of the adhesive layer [6] to the planar surface [8b] of the backing [8] causes, upon unwinding the tape (FIG. 3c), the microstructured adhesive layer [6] to cleanly transfer to the planar side [8b] of the backing [8].

Figure 4B:
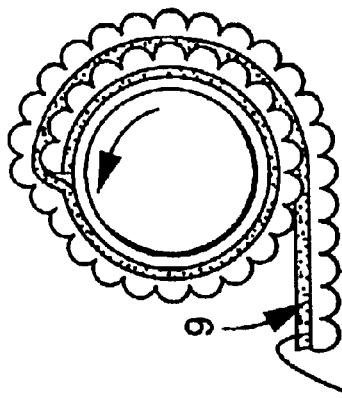
FIGS. 4a–4c illustrate a fourth method of making a pressure-sensitive adhesive tape of the invention.
Figure 4C:
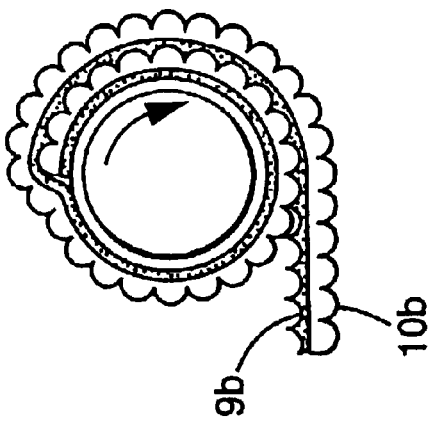
Figure 4A:
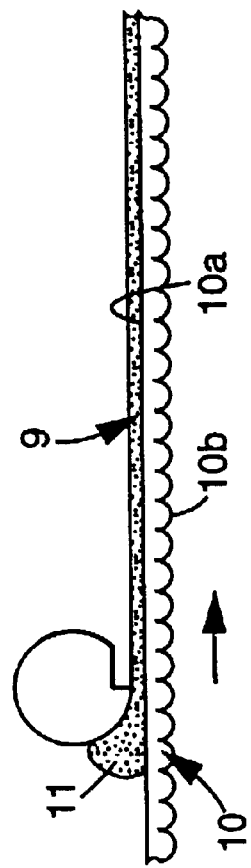

The fourth method illustrated by FIGS. 4a–4c involves coating an adhesive layer [9] on a similarly prepared or procured microstructured backing [10] as described supra in the third method of the present invention (FIG. 4a). The adhesive layer [9] in this method, however, is coated from the adhesive reservoir [11]on the planar backing surface [10a] and placed into contact with the microstructured surface [10b] of the backing. Referring to FIG. 4b, the pressure-sensitive adhesive layer [9] is embossed through this contact with the releasable microstructured backing surface [10b] and, thus, must be a composition capable of flowing under the thermal and compressive forces present in the process and storage conditions to replicate the features of the microstructure under the conditions of this contact. Again, a preferred means for embossing the adhesive layer [9] of a microstructure pressure-sensitive adhesive tape made by this fourth method is to wind the coated backing upon itself to form a roll (FIG. 4b). Referring to FIG. 4c, the microstructured surface [9b] the adhesive is then separated from the microstructured surface [10b] of the backing, yielding an exposed microstructured adhesive surface [9b].

Methods of Making Microstructured Transfer Coatings

A microstructured adhesive transfer coating may be prepared through the substitution of backings in the adhesive tapes of the first and second methods with release liners. Thus in a first method of making an adhesive transfer coating and an adaptation of the first method of making a microstructured adhesive tape, and as illustrated in FIG. 1, a pressure-sensitive adhesive layer [2] is first coated onto a substrate [1], which is a liner rather than a backing, and then the surface of the adhesive layer [2a] is embossed with and released from a microstructured molding tool [4] to form a microstructured adhesive surface [2b].

In a second method for making a microstructured transfer coating, and as illustrated in FIG. 2, the second method for making a microstructured tape is merely altered to produce a microstructured adhesive transfer coating by applying a substrate [1], which in this case is a release liner, instead of a backing, to the exposed surface [5a] of the pressure-sensitive adhesive layer [5] which has been coated onto a microstructured molding tool [4].

Both of these methods result in a transfer coating in which the release liner [1] is adhered to the non-embossed surfaces of the adhesive layers ([2] and [5]) and the microstructured surface of the adhesive layers are exposed. Another release liner can then be placed over the microstructured surfaces ([2b] or [5b]) of the adhesive layers ([2] or [5]) provided that the release surfaces do not encourage wetting by the adhesive and/or the rheological nature of the adhesive is such that it retains the microstructure without substantial deformation.

Should a transfer coating be desired in which the microstructured surface of the pressure-sensitive adhesive layer requires a release liner to preserve or protect the microstructured pattern, then the above methods can be further modified by replacing the microstructured molding tools used to impart a pattern into the adhesive with microstructured liners. Thus, instead of releasing the mold from the final articles as in the tape and transfer coatings described above, these methods for preparing transfer coatings result in articles which further comprise the mold used to impart the structure into the adhesive layer.

In a third method for making a microstructured pressure-sensitive adhesive transfer coating, and as illustrated in FIG. 5a, a microstructured liner [8] is employed to emboss a microstructure onto a pressure-sensitive adhesive layer [12] coated from reservoir [11] which is being carried by another release liner [13] in an adaptation of the first method of making such coatings. The microstructured surface [8a] of the liner is embossed into the adhesive layer [12] by rollers, platen, or other means of compressing the liner's microstructured surface [8a] against the adhesive layer surface [12a]. If the release liners utilized are flexible, a microstructured surface may be imparted as illustrated in FIG. 5b by winding the adhesive layer [12], between the two release liners [8] and [13] into a roll. Similar to the convoluted tape roll embodiments describe supra, the intimate contact and compressive forces exerted between the adhesive layer [12] and the microstructured liner [8] are sufficient to impart a microstructured surface into these adhesive layers. As the roll is unwound as demonstrated by FIG. 5c, either release liner may be removed to expose the desired surface (either the planer surface [12b] or the microstructured surface [12c]) of the adhesive layer depending on the application and requirements of the pressure-sensitive adhesive transfer coating.

As illustrated in FIGS. 3a–3c, by coating a pressure-sensitive adhesive layer [6] onto the microstructured surface [8a] of a microstructured release liner [8] rather than a microstructured molding tool, a fourth method for making a microstructured transfer coating may be similarly adapted. If both surfaces [8a] and [8b] of the microstructured liner [8] have release characteristics, then the coated liner of FIG. 3a can be wound upon itself to form a roll as illustrated in FIG. 3b. As illustrated in FIG. 3c, as the roll is unwound, the microstructured pressure-sensitive adhesive transfer coating releases at surface [6a] and/or [6b] and can be applied to a target substrate. Alternatively, a second release liner may be applied to the exposed planar surface [6a] of the adhesive layer [6] prior to winding.

Pressure-sensitive adhesive transfer coatings having the same or different microstructures on both surfaces of the adhesive layer can also be formed by alteration or combinations of these methods. For example, the first method may be altered by coating an adhesive layer onto a microstructured liner, followed by the embossing the exposed surface of the adhesive layer by a microstructured molding tool. In another embodiment, such transfer coatings can be prepared from an embossable adhesive layer which is microstructured by simultaneously or sequentially embossing both surfaces of the layer using microstructured molding tools or liners having the same or different microstructured patterns. Such articles can be useful in attaching or joining target substrates where the bond to each substrate must be initially repositionable. The long-term adhesion to each target substrate can then be set depending on the microstructures selected and the Theological properties of the adhesive layer against each target substrate.

Microstructured Molding Tools

A microstructured molding tool is an implement for imparting a structure or finish to a pressure-sensitive adhesive coating and which may be continuously reused in the process. Microstructured molding tools can be in the form of a planar stamping press, a flexible or inflexible belt, or a roller. Furthermore, microstructured molding tools are generally considered to be tools from which the microstructured adhesive pattern is generated by embossing, coating, casting, or platen pressing and do not become part of the finished microstructured adhesive article.

A broad range of methods are known to those skilled in this art for generating microstructured molding tools. Examples of these methods include but are not limited to photolithography, etching, discharge machining, ion milling, micromachining, and electroforming. Microstructured molding tools can also be prepared by replicating various microstructured surfaces, including irregular shapes and patterns, with a moldable material such as those selected from the group consisting of crosslinkable liquid silicone rubber, radiation curable urethanes, etc. or replicating various microstructures by electroforming to generate a negative or positive replica intermediate or final embossing tool mold. Also, microstructured molds having random and irregular shapes and patterns can be generated by chemical etching, sandblasting, shot peening or sinking discrete structured particles in a moldable material. Additionally any of the microstructured molding tools can be altered or modified according to the procedure taught in Benson U.S. Pat. No. 5,122,902 assigned to the assignee of the present case incorporated by reference herein. Finally, the microstructured molding tool must be capable of separating cleanly from the pressure-sensitive adhesive layer.

Microstructured Backings and Liners

Typically the microstructured backings and liners are made from materials selected from the group consisting of embossable or moldable materials having sufficient structural integrity to enable them to withstand the process of conveying the microstructure to the adhesive and be cleanly removed from the microstructured adhesive layer. Preferred materials which the microstructured liner may comprise include but are not limited to those selected from the group consisting of plastics such as polyethylene, polypropylene, polyesters, cellulose acetate, polyvinylchloride, and polyvinylidene fluoride, as well as paper or other substrates coated or laminated with such plastics. These embossable coated papers or thermoplastic films are often siliconized or otherwise treated to impart improved release characteristics. As noted in the discussions of methods for making the tapes and transfer coatings of the present invention, depending on the method employed and the requirements of the final article, one or both sides of these backings or liners must have release characteristics.

Microstructured liners and backings are available commercially from a number of sources. Specific examples of such include but are not limited to microstructured polyethylene and polypropylene coated paper liners of various densities such as those commercially available from P/S Substrates, Inc., Schoeller Technical Papers, Inc., and P.W.A. Kunstoff GMBH.

Features of Microstructured Surfaces

The microstructured molding tools, liners, backings, and, ultimately, the microstructured pressure-sensitive adhesive tapes and transfer coatings of the present invention have a multiplicity of projection features. The term "projection features" as used herein covers both negative and positive configurations providing microstructured adhesives with positive and negative configurations, respectively. These features are commonly referred to as negative or positive structures by those who are familiar in the art of microstructured technology. Each feature should or typically have a height of about 2.5 micrometers (0.0001") to about 375 micrometers (0.015"), preferably about 25 micrometers (0.001") to about 250 micrometers (0.010"), and most preferably about 25 micrometers (0.001") to about 125 micrometers (0.005") for reasons of minimizing thickness of the adhesive, increasing the density of the microstructured adhesive pattern sizes for symmetric patterns, and controlling the adhesion levels.

The shape of the features in the microstructured molding tool, backing or liner and the microstructured pressure-sensitive adhesive articles prepared therefrom can vary. Examples of feature shapes include but are not limited to those selected from the group consisting of hemispheres, prisms (such as square prisms, rectangular prisms, cylindrical prisms and other similar polygonal features), pyramids, ellipses, and grooves. Positive or negative features can be employed, i.e. convex hemispheres or concave hemispheres, respectively. The preferred shapes include those selected from the group consisting of hemispheres, pyramids (such as cube corners, tetrahedra, etc.), and "V" grooves, for reasons of pattern density, adhesive performance, and readily available methodology of the microstructured pattern generation or development. Although the exemplified features are non-truncated in nature, it is believed that truncated features will also be suitable in the articles of the present invention. The features of the microstructured liner may be systematically or randomly generated.

The limits of lateral dimensions of the features can be described by use of the lateral aspect ratio (LAR) which is defined as the ratio of the greatest microscopic dimension of the feature parallel to the plane of the continuous layer of adhesive to either the height of a positive feature or depth of a negative feature. Too large a LAR leads to a short squat feature that would not provide the advantages of microstructuring. Too small a LAR would lead to a tall narrow feature which would not stand upright due to the low flexural modulus of the pressure-sensitive adhesive (and therefore low flexural rigidity of the feature). That is, typical pressure-sensitive adhesive Theological properties will not support too small a LAR whereas too large a LAR approaches the realm of conventional pressure-sensitive adhesive tapes. Typical limits of the LAR would be about 0.1 to about 10, with most preferred limits of about 0.2 and about 5.

The nearest neighbor distance between features can be specified with a spacing aspect ratio (SAR) given by the ratio of center-to-center nearest neighbor distance to feature the greatest lateral microscopic dimension as defined for the LAR. The minimum value the SAR can assume is 1 which corresponds to the sides of features touching. This value is most useful for features such as hemispheres and pyramids which taper towards the top of the feature. For non-tapering and reverse-tapering features such as rods, square prisms, rectangular prisms, inverted cones, hemispheres, and pyramids, the SAR should be greater than 1 so that the perimeters of the top of the features do not touch and so form a new planar surface. A typical upper limit for the SAR would be 1.9 and a more desirable upper limit would be 1.5. A most preferred upper limit would be 1.1.

If the SAR is too great, positive features may not be able to support the remainder of the PSA above the surface. This leads to more extensive areas of contact between the PSA and target substrate than would be calculated using just the feature dimensions. That is, the adhesive comprising the "lands" between positive features would sag or flex and touch the target surface. The adhesive comprising the surface between negative features would comprise such a large continuous planar surface at a high SAR so as to render the features irrelevant for modification of peel forces. In either case of positive or negative features, carried to an extreme, a large SAR would lead to essentially a planar adhesive.

A pattern with asymmetry could be defined by multiple SARs. In the case of multiple SARs, all SARs should obey the limits listed above.

For example, one SAR might be concerned with both the feature width and nearest neighbor distance in the machine direction of the tape or transfer coating; this could be termed $SAR_{md}$. In a similar manner one could define a cross-direction ratio, $SAR_{cd}$, which is concerned with both the feature width and nearest neighbor distance in the cross (or transverse) direction of the tape or transfer coating. For patterns with one lateral macroscopic dimension, such as parallel V-grooves running in the machine direction, both the width and the nearest neighbor distance go to infinity, leading to an $SAR_{md}$ of 1.

The percentage of the surface area of a coating or liner which comprises features as opposed to flat surface is given approximately by:

Percent Coverage=$100/(SAR_{md} \times SAR_{cd})$.

For one dimensional features such as V-grooves, where $SAR_{md}=1$, $SAR_{cd}$ values of 1, 1.1, 1.5, and 1.9 produce percent coverages of 100, 91, 67 and 53%, respectively. For symmetric two-dimensional features such as hemispheres, pyramids, etc. spaced apart equally in the machine- and cross-directions, we have $SAR_{md}$ equal to $SAR_{cd}$ and SAR values of 1, 1.1, 1.5 and 1.9 produce percent coverages of 100, 83, 44, and 28%, respectively. For the general asymmetric case where $SAR_{md}$ does not equal $SAR_{cd}$, the percent coverage values have to be calculated using the above equation on a case by case basis. However, the limitations on the values of the SAR in any one direction as described earlier still apply. It should be noted that the above equation is a guide and may not apply accurately to very non-uniform patterns such as re-entrant features or random features or mixtures of different size and shape features on the same surface.

General Properties of Microstructured Pressure-Sensitive Adhesives

When a smooth (planar) adhesive undergoes changes in adhesion to a planar target substrate over time there are at least two possible effects which may be the cause. The first of these effects is a change of the chemical affinity of the adhesive surface towards the target substrate. This may take place through the movement in the polymeric chain either towards or away from the interface. The second of these effects is a flow of the polymer on the scale of nanometers to accommodate to the surface irregularities of the substrate; this scale of surface wetting enhancement cannot currently be detected optically.

The time dependency of the adhesion of the microstructured adhesives can possibly be attributed to a third and possible fourth effects which work along with the two above effects. This third effect is the change of the structure shape in response to the balance between the surface affinity of the two materials and the elastic recovery forces in the adhesive. This shape change will take place on a size scale of the order of micrometers for the microstructures of the present invention. The fourth effect is the trapping of air within negative features sealed to the target substrate. This trapped air works to keep the adhesive surface away from the target substrate surface and so to frustrate surface wetting. It should be noted that this same mechanism will frustrate adhesion in planar adhesives which are carelessly rolled onto a smooth substrate so as to trap air in pockets.

The selection of a positive or negative projection configuration for a particular projection feature will affect the peel adhesion characteristics of the resultant microstructured adhesive surface. Certain positive projection features such as positive hemispheres and positive pyramids contact a target substrate such that the initial contact area (the tip of the pyramid for example) has a smaller cross-section than the remainder of the projection feature. In those cases the choice of the adhesive will be critical in determining the long term characteristics of the microstructured adhesive coating. If a pressure sensitive adhesive is selected with properties such that the adhesion forces between the microstructured adhesive coating and the target substrate are stronger than the elastomeric recovery forces of the portion of the microstructured adhesive deformed upon application of the coating to the substrate, wetting can increase over time leading to a corresponding increase of peel adhesion level. Alternatively, if a pressure sensitive adhesive is selected with properties such that the adhesion forces between the adhesive portion in contact with the target substrate and the substrate are counterbalanced by the elastomeric recovery forces of the microstructured portion of the adhesive coating, wetting will remain nearly constant and the corresponding peel adhesion level will not change drastically over time.

Finally, if a pressure sensitive adhesive is selected with properties such that the adhesion forces between the microstructured adhesive coating and the substrate are weaker than the elastomeric recovery forces of the portion of the microstructured adhesive deformed upon application of the coating to the substrate, wetting can decrease over time leading to a corresponding decrease of peel adhesion level.

Non-tapering positive projections, such as cylindrical projections or cube projections (in which an entire face of the cube contacts the substrate), would not be expected to build in adhesion over time since the lateral dimension (cross-section) at the point of contact, and the base, as well as the entire length of the projection is the same.

Negative hemisphere or pyramid projections would not, as mentioned previously, provide microstructured surfaces that build significantly in peel adhesion over time. These negative projection features have an adhesive distribution such that the adhesive in the projection feature which does not initially contact the substrate does not completely wet the target substrate over time; thus, peel adhesion does not build appreciably over time.

Pressure-Sensitive Adhesives

Useful pressure-sensitive adhesives for the purposes of the present invention include those which are capable of retaining a microstructured surface after being embossed with a microstructured molding tool, backing or liner or after being coated on a microstructured molding tool, backing or liner from which it is subsequently removed. The particular pressure-sensitive adhesive used depends upon the microstructuring method employed in producing the microstructured pressure-sensitive adhesive article and the short and long term peel characteristics required in the final product. Finally, useful microstructured pressure-sensitive adhesive layers should be capable of retaining their microstructured surfaces for a time sufficient to allow for transport, storage, and handling before the ultimate utilization of the adhesive tape or transfer coating.

When an embossing process is used, a microstructure is imparted upon the continuous adhesive surface as defined by the pattern set by the microstructured molding tool, backing or liner. Thus, pressure-sensitive adhesives which flow and soften under the embossing process conditions and, when cooled if heat is required to impart a microstructured surface, maintain the microstructured pattern are required. Particularly well suited for this use are thermoplastic block copolymer adhesives, including but not limited to those selected from the group consisting of styrene-isoprene-styrene, styrene-butadiene-styrene, and styrene-ethylene/butylene-styrene block copolymers, such as the tackified adhesives described in U.S. Pat. Nos. 3,635,752 and 4,136,071 (Korpman) and U.S. Pat. Nos. 3,880,953 and 3,953,692 (Downey), all incorporated by reference herein. More preferably, acrylic polymeric pressure-sensitive adhesives modified with grafted high glass transition temperature (Tg) polymeric segments (Tg higher than the application temperature, but considerably lower than the processing temperature), such as those described in U.S. Pat. No. 4,554,324 (Husman et al.), incorporated herein by reference, can be embossed. Husman et al. describe a hot melt processible acrylate PSA which gains the needed balance of cohesive strength, high tack, and low melt viscosity through the chemical modification of the soft acrylate backbone by adding or grafting reinforcing high Tg polymeric moieties to the acrylate chain. These high Tg pendant moieties provide a "physical crosslinking" by forming glassy domains which enhance the cohesive strength of the adhesive at lower temperatures without significantly increasing the melt viscosity of the composition. Both of these classes of pressure-sensitive adhesive exhibit thermoplastic behavior, softening at processing temperatures and hardening when cooled, due to the morphological properties or their high Tg segments. The high Tg polymeric moieties typically have a Tg of above about 20° C. and a molecular weight in the range of about 2,000 to 30,000. The glassy domains formed by these high Tg polymeric moieties become fluid-like under process conditions and coalesce when cooled to reform glassy domains which function as thermally reversible, physical crosslinking sites.

The pressure-sensitive adhesive compositions useful in the embossing process of this invention can be in the form of solutions, emulsions or dispersions, or as hot melt coatings depending on the end use and process methods or conditions utilized in preparing the microstructured tapes and transfer coatings. Preferably, solventless and/or hot melt coatable pressure-sensitive compositions are employed. If a solventborne or waterborne pressure-sensitive adhesive composition is employed in any of the embossing methods, then the adhesive layer must undergo a drying step to remove all or a majority of the carrier liquid prior to embossing.

Microstructured pressure-sensitive adhesive tapes and transfer coatings prepared by methods which involve the coating of the adhesive on the microstructured molding tool, backing or liner may employ a variety of pressure-sensitive adhesive formulations and coating methods. The main limitation on this method is maintaining a sufficiently low viscosity of the pressure-sensitive adhesive such that the coating flows into the pattern of and easily displaces the air in the microstructured molding tool, backing or liner. Pressure-sensitive adhesives which can be hot-melt processed, such as the tackified block copolymer adhesives and the high Tg macromonomer modified acrylic polymeric pressure-sensitive adhesives described above, can be directly extruded onto the microstructured liner. If this coating method is used, then the extrusion die temperature must be high enough to cause the glassy domains of these adhesives to soften and allow the adhesives to flow into the microstructured features of the liner. The adhesive becomes cohesively strong as soon as the coating reaches a temperature below that of the glass transition temperature of the thermoplastic component of the adhesive.

Cast from concentrated solution, emulsion or dispersion, other classes of pressure-sensitive adhesive compositions can also be coated on the microstructured molding tools, backings and liners in accordance with these methods. Examples of such pressure-sensitive adhesive compositions include but are not limited to those selected from the group consisting of organic solvent based acrylics, waterborne acrylics, silicone adhesives, natural rubber based adhesives, and thermoplastic resin based adhesives. When organic solvent based or waterborne adhesive compositions are employed, coating on the microstructured molding tool, backing or liner must be followed by a drying step which is required to evaporate the carrier liquid from the coating. In these cases, a somewhat deformed pattern of the microstructured liner can be imparted to the adhesive coating. Suitable carrier liquids are those which are inert to the adhesive and to the liner and will not otherwise adversely affect the coating and drying procedure. Examples of such carrier liquids include but are not limited to those selected from the group consisting of water and organic solvents such as ethyl acetate, acetone, methyl ethyl ketone, and mixtures thereof. Depending on the concentration of the adhesive solution, the microstructured surface of the adhesive layer will differ from the microstructure of the molding tool, backing or liner due to shrinking upon drying. Thus, in order to minimize shrinkage of the microstructured surface from adhesives cast from solution, emulsion or dispersion, the concentration of the carrier liquid should be as low as possible to result in an adhesive of a sufficiently low viscosity to flow into the features of the microstructured liner.

Finally, a prepolymerized, radiation curable acrylate pressure-sensitive adhesive syrup containing a photoinitiator having sufficient coatable viscosity to conform to the features of the microstructured molding tool, liner or backing can be coated onto the microstructured molding tool, backing or liner according to these methods. While maintaining an oxygen free or near-oxygen free atmosphere, such photopolymerizable syrups may be cured after being coated on a microstructured molding tool, liner or backing by irradiation with ultraviolet light, as described in U.S. Pat. No. 4,181,752 (Martens et al.), incorporated herein by reference. A key requirement of microstructured pressure-sensitive adhesive articles made in this manner is that, following the coating step, the adhesive layer must be capable of exposure to an ultraviolet light source. To meet this requirement, unless an exposed surface of adhesive is present, at least one of the backings, liners or microstructured molding tools employed in the microstructuring process must allow the transmission of ultraviolet radiation to the microstructured pressure-sensitive adhesive layer.

Rheological Properties of Pressure-Sensitive Adhesives

The peel characteristics of the microstructured adhesives of this invention, aside from depending on the surface pattern and the chemical nature of the pressure-sensitive adhesive formulation used, can also be controlled through the modification of the rheological properties of the adhesive. The degree of crosslinking is one means for modifying pressure-sensitive adhesive rheology by selectively controlling the long term flow of the pressure-sensitive adhesive coating and the further wetting of adherend. The microstructured pressure-sensitive adhesives of this invention can be crosslinked by heat or radiation, forming covalently crosslinked networks which modify the adhesive's flowing capabilities. Alternatively, the physical crosslinking characteristics of the thermoplastic tackified block copolymer and the high Tg macromonomer modified acrylic polymeric pressure-sensitive adhesives described above can be used. These thermoplastic coatings can be further crosslinked by radiation, preferably by exposure to electron beams or formulated according to their proportion and/or molecular weight of high Tg polymeric segments, relying on the glassy domains of these adhesives to control the degree of long term adhesive flow.

Although in many applications a physical crosslinking of PSAs (by means of a presence of coreacted thermoplastic component in the polymeric system) is sufficient, the microstructured adhesive can be subjected to various processes which would provide a permanent (chemical) crosslinking to the PSA coatings.

Crosslinking agents can be added to all types of adhesive formulations but, depending on the coating and processing conditions, curing can be activated by thermal or radiation energy, or by moisture. In cases in which crosslinker addition is undesirable one can crosslink the microstructured adhesive if needed by exposure to an electron beam.

The degree of crosslinking can be controlled to meet specific performance requirements. For instance, for the PSA coatings in which a low initial adhesion should be followed by build-up of adhesion, no chemical crosslinking is needed and a low degree of physical "crosslinking" would be required. For permanently repositionable adhesives some degree of chemical crosslinking might be desirable, but in order not to badly affect the tack of the adhesive crosslink density has to be kept low. Tightly crosslinked adhesives could have increased elastomeric character thus being more prone to detach from a target substrate with time.

The PSA can optionally further comprise one or more additives. Depending on the method of polymerization, the coating method, the end use, etc., additives selected from the group consisting of initiators, fillers, plasticizers, tackifiers, chain transfer agents, fibrous reinforcing agents, woven and non-woven fabrics, foaming agents, antioxidants, stabilizers, fire retardants, viscosity enhancing agents, and mixtures thereof can be used.

Backings may be of any material which is conventionally utilized as a tape backing or may be of other flexible material, the only limitation being that the backing have adequate thermal stability so not to be degraded or deformed by the heat embossing process used in some of the methods of this invention. Such backings include, but are not limited to those selected from the group consisting of poly (propylene), poly(ethylene), poly(vinyl chloride), polyester [e.g., poly(ethylene terephthalate)], polyamide films such as duPont's Kapton™, cellulose acetate, and ethyl cellulose. Backings may also be of woven fabric formed of threads of synthetic or natural materials including but not limited to those materials selected from the group consisting of cotton, nylon, rayon, glass or ceramic material, or they may be of nonwoven fabric such as air laid webs of natural or synthetic fibers or blends of these. In addition, the backing may be formed of materials selected from the group consisting of metal, metallized polymeric film, and ceramic sheet materials.

The PSA compositions employed in the articles and methods of the present invention can be coated onto backings without modification by extrusion, coextrusion, or hot melt techniques, roll coating, knife coating, curtain coating, and the like by employing conventional coating devices for this purpose.

Test Methods

Peel Adhesion

[Reference: ASTM D3330-78 PSTC-1 (11/75)]

Peel adhesion is the force required to remove a coated flexible sheet material from a test panel measured at a specific angle and rate of removal. In the examples, this force is expressed in Newtons per decimeter (N/dm) width of coated sheet. Following equilibration of samples at 50% relative humidity and 22° C., both immediate and aged (24 hours dwell) peel adhesion measurements were taken following the application of the sample to a glass test surface. The procedure followed was:

1. A 12.7 mm width of the coated sheet was applied to the horizontal surface of a clean glass plate with at least 12.7 lineal cm in firm contact. A 2 kg hard rubber roller was used to apply the strip.
2. The free end of the coated strip was doubled back nearly touching itself so the angle of removal was 180°. The free end was attached to the adhesion tester scale.
3. The glass plate was clamped in the jaws of a tensile testing machine which was capable of moving the plate away from the scale at a constant rate of 2.3 meters per minute.
4. The scale reading in Newtons was recorder as the tape was peeled from the glass surface. The data is reported as the average of the range of numbers observed during the test.

Percent Wetout

This technique is used to study the wetting of a rough-surfaced adhesive onto a smooth transparent substrate. The hardware used with this technique consists of a stereo-microscope (Olympus Model SZH-ZB), a video-camera (Cohu Model 4815) mounted on the microscope, a coaxial vertical illuminator (Olympus Model TL2), and a computer (Hewlett-Packard Vectra™ QS/20) with a video digitizing board (Imaging Technologies PCVISIONplus™) installed which allows the computer to capture and digitize an image. Such an image can subsequently be stored and analyzed by commercial software packages (Jandel JAVA™). The coaxial vertical illuminator provides light which is sent through the lens (i.e., the optic axis) to illuminate the subject. This light passes through a circular polarizer mounted on the end of the planar objective lens of the microscope. In practice, the procedure is as follows:

1. Apply the adhesive tape onto a glass (or other optically clear and flat) surface in a reproducible manner.
2. Position the laminate so that the adhesive/glass interface is viewed through the glass by a stereo microscope.
3. Adjust the sample so that the glass is perpendicular to the optic axis.
4. Adjust the circular polarizer to optimize light intensity and contrast.
5. Using the image analysis software, capture and digitize the image.
6. Set the software grey value window of acceptance to accept only those grey values (i.e., brightness levels) corresponding to the wet areas.
7. Analyze the total wet area as a percentage of the total imaged area.

This technique can be used both to monitor the adhesive samples' wetout patterns over time and measure the percent wetout of a single bonded sample with time. The percent wetout values shown in the following table were derived from images taken at the same location of adhesive/glass substrate at different times after application.

Abbreviations and Trade Names

The following abbreviations and trade names are used herein:

| | |
|---|---|
| IOA | Isooctyl acrylate |
| AA | Acrylic acid |
| PS Macromer | Polystyrene with terminal methacrylate group |
| ACMAS | Acrylamidoamido Siloxanes |
| MW | Number average molecular weight |

Preparation of Microstructured Molding Tools

EXAMPLE 1

Preparation of 10K ACMAS and 35K ACMAS Molding Material

A diamino functional polysiloxane terminated on both ends with ethylenically unsaturated groups were prepared by the method described in U.S. Pat. No. 5,091,483 (Mazurek et al.), incorporated herein by reference and described below. A 500 Ml 3-necked round bottom flask equipped with thermometer, mechanical stirrer, dropping funnel, and dry argon inlet was charged with 7.74 g of bis(3-aminopropyl) tetramethyldisiloxane and 36 g of octamethylcyclotetrasiloxane ($D_4$) which had been previously purged for 10 minutes with argon. The flask contents were heated to 80° C. with an oil bath, following which a trace amount (about 0.03 to 0.05 g) of an anhydrous 3-aminopropyl dimethyl tetramethylammonium silanolate catalyst was added via a spatula to the flask contents. The reaction mixture was stirred at 80° C. and after 30 minutes of stirring had become quite viscous. Vapor phase chromatography (VPC) showed that the end-blocker had completely disappeared. To the resultant reaction mixture (which consisted of a 1,500 number average molecular weight polysiloxane with aminopropyl end groups, cyclic siloxanes, and active catalyst) was added dropwise over a six hour period 310 g of argon-purged $D_4$, resulting in a further rise in the viscosity. The reaction flask contents were maintained at 80° C. overnight. The catalyst was decomposed by heating at 150° C. for ½ hour, and the product was stripped at 140° C. at 0.1 mm pressure until no more volatiles distilled (ca. ½ hours), resulting in 310 g of a clear, colorless, viscous oil (a yield of 88% of theoretical). The number average molecular weight of the product determined by acid titration was 10,000. Using this procedure, but varying the ratio of endblocker to $D_4$, a silicone diamine with a number average molecular weight of 35,000 was also prepared.

A polydimethylsiloxane terminated on both ends with acrylamidoamido groups (ACMAS) and having a number average molecular weight of about 10,000 was prepared by thoroughly mixing 100 g (0.01 mole) of aminopropyl-terminated polydimethylsiloxane prepared according to the above description with 2.78 g (0.02 mole) vinyl dimethyl azlactone (VDM), prepared as described in U.S. Pat. No. 4,777,276 (Rasmussen et al.), at room temperature. The viscosity of the reaction mixture increased as the reaction progressed. The number average molecular weight of the difunctional polysiloxane was determined by acid titration of the precursor and was confirmed by gel permeation chromatography (GPC) analysis before and after capping with VDM. A 35,000 MW ACMAS was prepared similarly.

EXAMPLE 2

This example demonstrates the blending of the ACMAS materials of Example 1 for the preparation of the microstructured molding tools and the making of the microstructured molding tools used in imparting microstructures to the pressure-sensitive adhesives of the present invention. 10,000 MW ACMAS (5.0 g) was mixed with 35,000 MW ACMAS (5.0 g) and 0.02 g 2-hydroxy-2-methyl-1-phenyl-propan-1-one, available from EM Industries under the tradename Darocur™ 1173 and was coated to a thickness of 2 mm against a microstructured surface. After covering the non-structured surface of the coating with a polyester film, the mixture was then exposed to UV irradiation at 2.6 mW/cm² (Sylvania Blacklight) for 10 minutes and the mold was separated from the microstructured surface.

The following microstructured molding tools were made using the following microstructured surfaces:

EXAMPLE 3
Convex Hemispheres (Positive Features)

Figure 6:
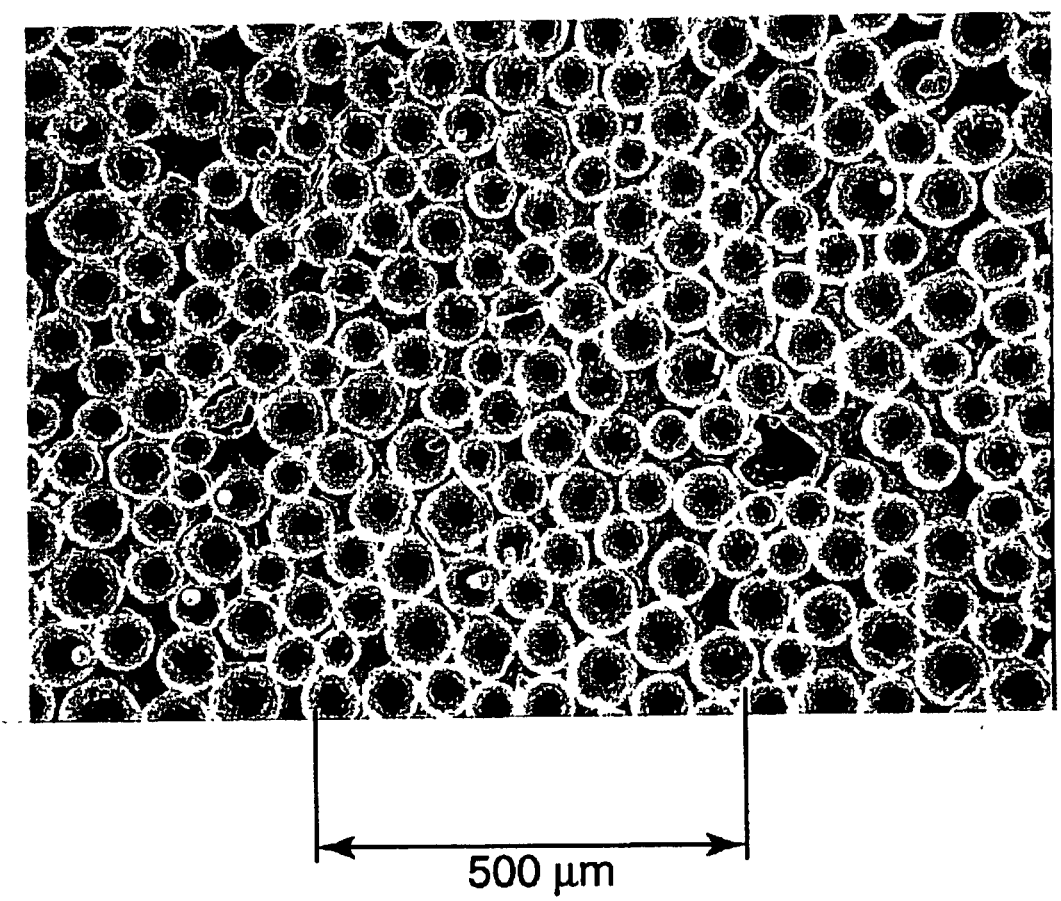
FIG. 6 illustrates a scanning electron micrograph of a convex hemispheric microstructured surface.

A microstructured molding tool having convex hemispheres as features on its surface was prepared in the following manner from a glass microsphere embedded liner made in accordance with U.S. Pat. No. 4,025,159 (McGrath), incorporated herein by reference: Glass microspheres ranging between about 50 and 80 µm were embedded by standard procedures to about 40 percent of their diameter in a 25 µm-thick layer of polyethylene which is carried on paper. The glass microspheres are released from the polyethylene, leaving an aperiodic concave hemispherical microstructured polyethylene liner as shown in top plan view in FIG. 6. The polyethylene liner was then attached to a glass plate and the glass plate bordered by a gasket. The microstructured molding tool having a convex (i.e., positive) microstructure was made by coating and curing a layer of liquid silicone rubber as described in Example 2 against the polyethylene liner and separating the cured silicone microstructured molding tool from the polyethylene liner. The microstructured molding tool had positive features of an average feature height of approximately 50 µm, lateral aspect ratio (LAR) of approximately 2.5, and a spacing aspect ratio (SAR) of approximately 1.5.

EXAMPLE 4
Cube Corners of Positive Features

Figure 7:
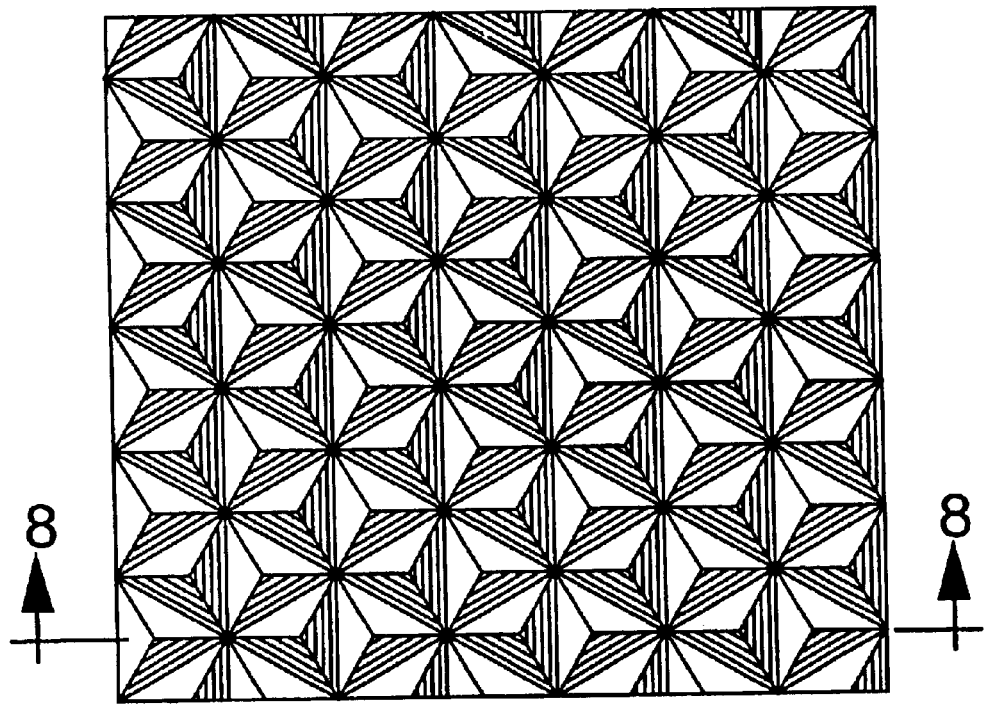
FIG. 7 illustrates a top plan view of a microstructured molding tool having cube corners of positive features.
Figure 8:
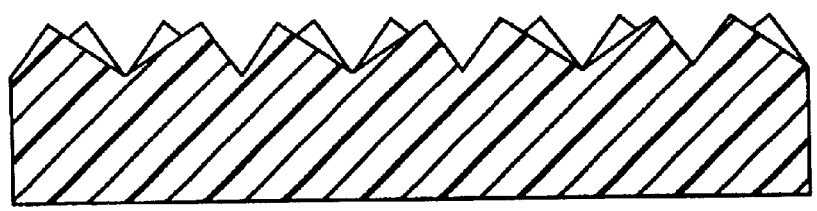
FIG. 8 illustrates a cross-sectional view as indicated by FIG. 7 and illustrates a microstructured molding tool having cube corners of positive features.

A microstructured master was prepared by micromachining a cube corner (i.e., triangular pyramid) pattern having positive features into a metal plate in accordance with the methods described in U.S. Pat. No. 4,558,258 (Hoopman), incorporated herein by reference, and illustrated in top plan view by FIG. 7. Using standard techniques, a nickel electroform replica (i.e., having negative features) of the microstructured master was then formed. A microstructured molding tool with cube corners of positive features on its surface was made by coating and curing a layer of the liquid silicone rubber as described in Example 2 onto the microstructured nickel electroform replica and separating the cured microstructured molding tool from the electroformed replica. The resulting microstructured molding tool had positive features (as illustrated in cross-sectional view in FIG. 8) of an average feature height of approximately 62.5 µm, lateral aspect ratio (LAR) of approximately 2, and a spacing aspect ratio (SAR) of approximately 1.

EXAMPLE 5
Cube Corners of Negative Features

Figure 9:
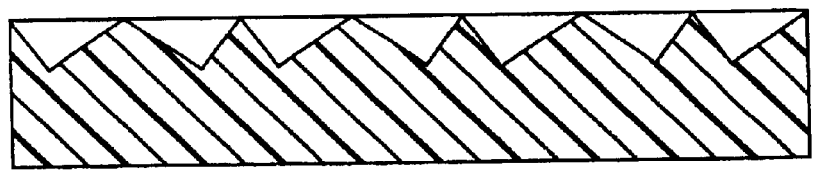
FIG. 9 illustrates a cross-sectional view of a microstructured molding tool having cube corners of negative features.

A microstructured molding tool with cube corners of negative features on its surface was made by coating and curing a layer of the liquid silicone rubber as described in Example 2 onto a positive-featured second nickel electroformed replica formed by replicating the nickel electroform of Example 4. Following the separation of the cured silicone materials from the second nickel electroform, a microstructured molding tool having negative features (as illustrated in cross-sectional view in FIG. 9) of an average feature depth of approximately 62.5 µm, lateral aspect ratio (LAR) of approximately 2, and a spacing aspect ratio (SAR) of approximately 1 was formed.

The following microstructured liners were made and used in the preparation of microstructured PSAs.

EXAMPLE 6
V-Shaped Grooves

A roll of microstructured liner, which was also used as a microstructured molding tool, was made in a continuous process by the following method: A microstructured roll having V-shaped grooves (feature height=50 µm, lateral aspect ratio (LAR)=2, spacing aspect ratio (SAR)=1) was prepared using a micromachining tool in a machinable substrate. The liquid silicone rubber of Example 2 was then coated against an unprimed polyester film and the silicone rubber was simultaneously embossed by the microstructured roll and cured by exposure to high intensity UV light. This process resulted in a microstructured liner which replicated the features of the microstructured roll.

EXAMPLE 7
Concave Hemispheres

A microstructured liner with negative hemispherical features on its surface was made by depositing a UV curable epoxysilicone release layer on the microstructured surface of the concave microstructured polyethylene liner described in Example 3. The microstructured liner had negative features of an average feature depth of approximately 50 µm, lateral aspect ratio (LAR) of approximately 2.5, and a spacing aspect ratio (SAR) of approximately 1.5.

Preparation of Adhesive Compositions

EXAMPLE 8
Preparation of Polystyrene Macromer

A methacrylate-terminated polystyrene polymeric monomer having an average molecular weight of 10,000 was prepared in accordance with U.S. Pat. No. 4,554,324 (Husman et al.), incorporated herein by reference, and described below. A flame-dried 5 liter glass 5-necked flask equipped with a mechanical stirrer, gas inlet, condenser, addition funnel, and thermometer was purged with dry argon, and charged with 2100 g cyclohexane which had previously been distilled from polystyryl lithium. The cyclohexane was heated to 50° C. and 20 ml of a 1.17 molar solution of sec-butyllithium in cyclohexane (23.4 millimoles) were added to the flask via a syringe. Purified styrene monomer (175 g) was added in one portion to the flask, resulting in an exothermic reaction. The temperature was maintained at less than 74° C. by cooling and then, during the next hour, the reaction mixture was maintained at approximately 50° C. Thereafter, the mixture was cooled to 40° C. and ethylene oxide previously passed over sodium hydroxide was introduced with vigorous stirring until the red color of polystyryl lithium had changed to a faint yellow. Thereupon the reaction was quenched with 1.4 g (23.4 millimoles) acetic acid. The reaction mixture was saturated with dry air, 10.9 g (70.2 millimoles) 2-isocyanatoethyl methacrylate and 4 drops of tin dioctoate catalyst were added, and the resultant mixture was heated to 60° C. and maintained at that temperature for 14 hours.

The mixture was then cooled and the polymer was precipitated in 30 liters of methanol, dried in vacuo, to yield 170 g (97% yield) methacrylate-terminated polystyrene monomer having a number average molecular weight of 9,600, a weight average molecular weight of 10,464, and a polydispersity of 1:09 as determined by conventional gel permeation chromatography (GPC).

EXAMPLE 9
Preparation of "Hard" Pressure-Sensitive Adhesive

A thermoplastic pressure-sensitive adhesive having a high concentration of high glass transition temperature (Tg) grafted polymeric segments (i.e., a "hard" pressure-sensitive adhesive) consisting of a copolymer of 84 parts by weight isooctyl acrylate, 6 parts by weight acrylic acid, and 10 parts by weight the methacrylate-terminated polystyrene polymeric monomer of Example 8 was prepared as described in U.S. Pat. No. 4,554,324 (Husman et al.), incorporated herein by reference.

In a glass reaction bottle was placed 14.8 grams isooctyl acrylate, 1.2 gram acrylic acid, 2.0 grams methacrylate-terminated polystyrene macromer of Example 3, 2.0 grams of a stock solution consisting of 0.5 g carbon tetrabromide and 99.5 g isooctyl acrylate, 30 grams of ethyl acetate and 0.06 grams of 2,2'-azobis(isobutyronitrile) free radical initiator available under the trademark "VAZO" 64 from the E.I. DuPont Company. The reaction bottle was purged with nitrogen, sealed, and tumbled in a 55° C. water bath for 24 hours.

EXAMPLE 10
Preparation of "Soft" Pressure-Sensitive Adhesive

A thermoplastic pressure sensitive adhesive having a low concentration of high Tg grafted polymeric segments (i.e., a "soft" pressure-sensitive adhesive) consisting of a copolymer of 92 parts by weight isooctyl acrylate, 4 parts by weight acrylic acid, and 4 parts by weight the methacrylate-terminated polystyrene polymeric monomer of Example 8 was prepared in the same manner as Example 9.

EXAMPLE 11
Preparation of Tackified Block Copolymeric Pressure-Sensitive Adhesive A thermoplastic pressure-sensitive adhesive was prepared by mixing, in sufficient toluene to form a 40% by weight solids solution, 60 parts by weight of a styrene-isoprene-styrene (ABA) block copolymer (Kraton™ D1107, commercially available from Shell Chemical Co.) and 40 parts by weight of a solid tackifying resin (Wingtack Plus™, an aromatically modified petroleum resin having a ring & ball softening point of 93–100° C., a specific gravity of 0.93 at 25° C., and a molecular weight of 1100 available from Goodyear Tire and Rubber Co.).

EXAMPLE 12
Preparation of a Waterborne Acrylic Pressure-Sensitive Adhesive

A waterborne acrylic pressure-sensitive adhesive was prepared according to the emulsion polymerization method of Example 5 of U.S. Pat. No. Re. 24,906 (Ulrich), incorporated herein by reference. A mixture of 104 parts by weight distilled water, 8 parts by weight of a 28% solution of alkylated aryl polyether sodium sulfonate (commercially available as Triton X-200™ from Union Carbide Chemicals and Plastics Co.), 95 parts isooctyl acrylate, 5 parts acrylic acid, and 0.08 parts tertiary dodecyl mercaptan was purged with nitrogen and brought to 30° C. with agitation. There was then added 0.2 part of potassium persulfate and 0.067 part of sodium bisulfate. Following polymerization, the acrylic polymer (having an inherent viscosity of 1.05 to 1.35 in tetrahydrofuran) was recovered from emulsion and dissolved in an 80/20 mixture of heptane and propyl alcohol to a solids content of 44.2% by weight.

EXAMPLE 13
Preparation of a UV Curable Pressure-Sensitive Adhesive

A radiation curable pressure-sensitive adhesive used to prepare microstructured PSA tapes by radiation curing against a microstructured molding tool, liner and/or backing was prepared in the following manner: A mixture of 90 parts isooctyl acrylate, 10 parts of acrylic acid, 0.04 part 2,2-dimethoxy-2-phenyl acetophenone (obtained as Escacure™-KB-1 from Sartomer) was inerted and partially photopolymerized to a conversion of about 7% under ultraviolet (UV) irradiation (40 watt fluorescent black lamp having 90% of the emissions between 300 and 400 nm and a maximum at 351 nm and which provides radiation intensity of about 1–2 mW/cm$^2$) to yield a coatable syrup of about 3,000 cPs. Prior to coating on a microstructured molding tool, liner or backing, 0.1 part of Escacure™-KBI and 0.1 part 1,6-hexanediol diacrylate (HDDA) were added to the syrup with thorough mixing.

Preparation and Peel Adhesion Testing of Embossed Adhesive Samples

EXAMPLE 14

A continuous layer of the "hard" thermoplastic adhesive of Example 9 was coated onto a 37.5 μm (0.0015 inch) primed polyester film using knife coater to a thickness of 62.5 μm (0.0025 inch) and the coating was dried in the oven at 60° C. for 10 min. The coated adhesive was embossed using the cube corners microstructured silicone molding tool of Example 5 (cube corners of negative features) using a Carver Laboratory Press Model M at 120° C. and 15,000 psi pressure for 30 minutes. During embossing the adhesive coating in contact with the silicone molding tool was placed between the two metal plates, cushioned by a layer of the heat resistant foam and surrounded by a aluminum spacer to prevent an excessive pressure. After cooling, the microstructured pressure-sensitive adhesive tape sample was separated from the molding tool, cut into 25 mm wide strips, and subjected to both immediate and aged 180° peel adhesion testing as described above against a glass target substrate. The results of these tests are recorded in Table 1.

EXAMPLE 15

A microstructured pressure sensitive adhesive tape sample was prepared and tested in accordance with Example 14, except that the tape sample was coated with the "soft" thermoplastic pressure-sensitive adhesive of Example 10. The results of these tests are recorded in Table 1.

EXAMPLE 16

A microstructured pressure-sensitive adhesive tape sample was prepared and tested in accordance with Example 14, except that the tape sample was embossed with the microstructured molding tool of Example 4 (cube corners of positive features). The results of these tests are recorded in Table 1.

EXAMPLE 17

A microstructured pressure-sensitive adhesive tape sample was prepared and tested in accordance with Example 16, except that the tape sample was coated with the "soft" thermoplastic pressure-sensitive adhesive of Example 10. The results of these tests are recorded in Table 1.

COMPARATIVE EXAMPLE C-1

A comparative pressure-sensitive adhesive tape sample was prepared by coating a continuous layer of the thermoplastic adhesive of Example 9 using a knife coater to a dry thickness of 62.5 μm (0.0025 inch) onto a primed polyester 37.5 μm (0.0015 inch). The coated planar adhesive was dried in an oven for 10 minutes at 60° C., cooled, cut into 25 mm wide strips, and subjected to both immediate and aged 180° peel adhesion testing as described above against a glass target substrate. The results of these tests are recorded in Table 1 and Table 2.

COMPARATIVE EXAMPLE C-2

A comparative pressure-sensitive adhesive tape sample was prepared and tested in accordance with Comparative Example C-1, except that the tape sample was coated with the "soft" thermoplastic pressure-sensitive adhesive of Example 10. The results of these tests are recorded in Table 1 and Table 2.

TABLE 1

| Example | Cube Corners (+/−) | Adhesive (hard/soft) | Peel Adhesion (N/dm) Immediate | 24 hours |
|---|---|---|---|---|
| 14 | + | hard | 43.8 | 4.4 |
| 15 | + | soft | 50.3 | 48.2 |
| 16 | − | hard | 15.3 | 4.4 |
| 17 | − | soft | 17.5 | 15.3 |

TABLE 1-continued

| Example | Cube Corners (+/−) | Adhesive (hard/soft) | Peel Adhesion (N/dm) Immediate | 24 hours |
|---|---|---|---|---|
| C-1 |  | hard | 61.3 | 81.0 |
| C-2 |  | soft | 74.4 | 63.5 |

"+" denotes cube corners of positive features
"−" denotes cube corners of negative features
"hard" denotes the 84/6/10 IOA/AA/PS Macromer thermoplastic pressure-sensitive adhesive of Example 9
"soft" denotes the 92/4/4 IOA/AA/PS Macromer thermoplastic pressure-sensitive adhesive of Example 10

Analysis of the data presented in Table 1 indicates that in microstructured pressure-sensitive adhesives two main forces can counteract: adhesion to the substrate and a restorative elastomeric forces of the adhesive. Harder, more elastomeric adhesives having a small contact area with the target substrate (e.g. Example 16) tend to be self-debonding, showing a decrease of peel force with time. On the other hand, the peel force of softer adhesives having the same microstructured pattern demonstrates permanent repositionability in Example 17.

More dramatic changes are observed in the case of adhesives with positive features (i.e., cube corners out). The soft adhesive of Example 15 demonstrates permanent repositionability but, due to a higher proportion of contact area with the target substrate, at a higher level of initial and aged peel adhesion than Example 17. The hard adhesive of Example 14 embossed with the same structure shows a strong initial adhesion which drops with time; after 24 hours it is very low. Thus, through controlling both the rheology and the microstructured surface pattern the pressure-sensitive adhesives of the present invention, adhesive coatings having a range of initial repositionabilities and aged adhesion characteristics can be obtained.

EXAMPLES 18 AND 19

These examples illustrate that permanently repositionable microstructured pressure-sensitive adhesive tapes which perform in different peel adhesion ranges can be made by varying the adhesive composition on identical microstructures. In Example 18, a microstructured pressure sensitive adhesive tape sample was prepared and tested in accordance with Example 14, except that the microstructured molding tool of Example 3 (positive hemispheres) was used. Example 19 was prepared in accordance with example 18 except that the "soft" adhesive of Example 10 was used. The results of immediate and aged peel testing from glass of these samples having convex hemispheric features are recorded in Table 2. Percent wetout was also measured and recorded at different time intervals after being applied to a glass test surface using light application force (0.85 Newtons) and heavier force (20 Newtons) in Table 3.

EXAMPLE 20

A microstructured pressure-sensitive adhesive tape sample was prepared in accordance with example 14, except that the tape sample was coated with tackified block copolymeric thermoplastic adhesive of Example 11 and was embossed with the microstructured molding tool of Example 6 (microstructured liner) with a V-groove microstructured surface. Both the initial adhesion and aged 180° peel adhesion to glass target substrate were measured and recorded in Table 2.

COMPARATIVE EXAMPLE C-3

A comparative pressure-sensitive adhesive tape was prepared in accordance with Comparative Example C-1, except that the tape sample was coated with the thermoplastic adhesive of Example 11 to a dry thickness of 50 μm (0.002 inch). Both the initial adhesion and aged 180° peel adhesion to glass target substrate were measured and recorded in Table 2.

EXAMPLE 21

The following example illustrates a microstructured pressure sensitive adhesive tape which builds adhesion with time. A microstructured pressure-sensitive adhesive tape was prepared by casting using a knife coater the waterborne-pressure-sensitive adhesive of Example 12 against the microstructured liner prepared as in Example 6 to a dry thickness of 50 μm (0.002 inch). After drying the sample in the oven at 60° C. for 10 minutes, the adhesive was laminated to a primed polyester film using GBC Desktop laminator. The pressure-sensitive adhesive tape sample was subsequently removed from the microstructured liner and applied to a glass target substrate. The results of immediate and aged peel testing from glass are recorded in Table 2. Percent wetout was also measured and recorded in Table 3 at different time intervals after being applied to a glass test surface using light application force (0.85 Newton).

COMPARATIVE EXAMPLE C-4

A comparative pressure-sensitive adhesive tape was prepared in accordance with Comparative Example C-1, except that the tape sample was coated with the waterborne adhesive of Example 12 to a dry thickness of 50 μm (0.002 inch). Both the initial adhesion and aged 180° peel adhesion to glass target substrate were measured and recorded in Table 2.

EXAMPLE 22

A microstructured pressure-sensitive adhesive tape was prepared by coating a radiation curable adhesive of Example 13 between the microstructured liner of Example 7 and primed polyester film, exposing the construction to low-intensity UV lights through the film for 5 min. The pressure-sensitive adhesive tape sample was subsequently removed from the microstructured liner and applied to a glass target substrate. Both the initial and aged 180° peel adhesion force was measured and recorded in Table 2. Percent wetout was also measured and recorded in Table 3 at different time intervals after being applied to a glass test surface using light application force (0.85 Newton).

COMPARATIVE EXAMPLE C-5

A comparative pressure-sensitive adhesive tape was prepared and tested in accordance with comparative Example C-1, except that the tape sample was coated with radiation-curable adhesive of Example 13 to a thickness of 100 μm (0.004 inch). Both the initial and aged 180° peel adhesion force was measured and recorded in Table 2.

EXAMPLE 23

The following example illustrates a method of making a microstructured pressure-sensitive adhesive tape by applying compressive forces at room temperature to an embossable adhesive in contact with a microstructured surface. A microstructured pressure-sensitive adhesive tape was prepared by coating a layer of the waterborne pressure-sensitive adhesive of Example 12 with a knife-coater to a thickness of 37.5 μm (0.0015 inch) on a polyester backing, drying the unstructured tape in an oven, and applying to the V-grooved microstructured liner of Example 6 to the exposed surface of the adhesive layer. To the top of this 5 cm×5 cm laminate a dead-load of 73.5 Newtons was placed for 16 hours to emboss the adhesive surface under this compressive force at room temperature. Both the initial adhesion and aged 180° peel adhesion to glass target substrate were measured and recorded in Table 2.

TABLE 2

| Ex. | Microstructure | Pressure-Sensitive Adhesive (Example No.) | Peel Adhesion (N/dm) Immediate | 24 hours | % change |
|---|---|---|---|---|---|
| 18 | Hemisphere in | Hard Thermoplastic (9) | 11.4 | 8.3 | −27% |
| C-1 | Planar | Hard Thermoplastic (9) | 61.3 | 81.0 | +32% |
| 19 | Hemisphere in | Soft Thermoplastic (10) | 22.8 | 19.7 | −14% |
| C-2 | Planar | Soft Thermoplastic (10) | 74.4 | 63.5 | −15% |
| 20 | V-Groove | Block Copolymer (11) | 33.3 | 52.1 | +56% |
| C-3 | Planar | Block Copolymer (11) | 106.4 | 114.3 | +7% |
| 21 | V-Groove | Waterborne (12) | 18 | 41.6 | +131% |
| C-4 | Planar | Waterborne (12) | 35.5 | 58.9 | +66% |
| 22 | Hemisphere out | UV Curable (13) | 129.4 | 139.4 | +8% |
| C-5 | Planar | UV Curable (13) | 122.6 | 170.1 | +39% |
| 23 | V-Groove | Waterborne (12) | 23.0 | 30.6 | +33% |

TABLE 3

| Example | Reading 1 (initial) | Reading 2 (minutes) | Reading 3 (minutes) | Reading 4 (minutes) | Reading 5 (minutes) | Reading 6 (minutes) |
|---|---|---|---|---|---|---|
| 18* | 35.4% | 34.0% (30) | 37.3% (105) | 30.5% (310) | 34.1% (1240) | * * * |
| 19* | 38.0% | 43.5% (30) | 46.1% (105) | 47.8% (310) | 51.6% (1240) | * * * |
| 18** | 58.3% | 59.8% (30) | 59.8% (120) | 58.3% (455) | 50.0% (1440) | * * * |
| 19** | 75.3% | 71.9% (30) | 74.8% (120) | 72.2% (455) | 69.1% (1440) | * * * |
| 21* | 43.0% | 55.3% (30) | 63.8% (90) | 68.4% (210) | 72.3% (450) | 83.9 (1440) |
| 22* | 38.4% | 35.5% (120) | 36.1% (315) | 33.5% (1380) | * * * | * * * |

"*" denotes percent wetout testing using a low application force (0.85 Newtons)
"**" denotes percent wetout testing using a high application force (20 Newtons)

In Example 18 (negative hemispheres with a hard adhesive) the peel force decreases with time. The planar adhesive analog, Comparative Example C-1, shows an increase of adhesion with time. The data of Table 3 show that for this example both the high and low force rolldown samples demonstrate a slight decrease in percent wetout with time. Thus the elastic recovery force which is itself a product of the microstructure shape, the higher modulus of the adhesive and trapped air within the concave hemispheres dominates the other effects in this example.

In Example 19 (negative hemispheres with a soft adhesive) the peel force also decreases with time. The planar adhesive analog, Comparative Example C-2, shows a decrease in peel adhesion with time also. The data of Table 3 show that for this example the high force rolldown sample shows a decrease in percent wetout with time. The low force sample shows an increase in percent wetout with time, but the percent wetout value obtained after one day is less than either the initial or final wetout of the high force application. Although not wishing to be bound by theory, it is believed that an equilibrium percent wetout exists somewhere between 52% and 69% for this adhesive/geometry combination applied to glass. Although this is a softer adhesive, once again the microstructure shape, modulus, and trapped air work to restore an equilibrium different from the initial conditions.

In Example 20 (V-grooves with a block copolymer adhesive) the peel force increases substantially with time. The planar adhesive of Comparative Example C-3 shows a less dramatic increase of adhesion with time.

In Example 21 (V-grooves with a waterborne adhesive) the peel force also increases substantially with time. The planar adhesive analog, Comparative Example C-4, also shows a substantial increase of adhesion with time. The data of Table 3 show that for this example the low force rolldown sample shows a substantial increase in percent wetout with time. In this system it appears that the chemical affinity, the nanoscale wetting and the microscale wetting all work to increase the percent wetout with time. Trapped air is not a factor here due to the grooved microstructure which allows trapped air to escape from the interface between the adhesive surface and the target substrate.

In Example 22 (V-grooves with a UV-cured adhesive) the peel force increases slightly with time. The planar adhesive analog, Comparative Example C-5, shows a substantial increase of adhesion with time. The data of Table 3 show that for this example the low force rolldown sample shows a slight decrease in percent wetout with time. We may conclude with this formulation that the light crosslinking of the adhesive by UV radiation tends to increase the restoring force; this works to decrease the wetout with time. However this effect is dominated by the chemical affinity and/or nanoscale flow effects which tend to increase adhesion as witnessed by the planar control. Once again, in this example trapped air is not a factor.

In Example 23 (V-grooves with a waterborne adhesive), the peel force increases with time, but not to the extent of the planar analog, Comparative Example C-4. The similarly formulated and microstructured tape sample of Example 21, which was made by an alternative method, demonstrates an even greater increase of peel adhesion over time when compared to this example.

Various modifications and alterations of this invention will become apparent to those skilled in the art without departing from the scope and spirit of this invention, and it should be understood that this invention is not to to be unduly limited to illustrative embodiments set forth herein.

We claim:

1. A coated substrate comprising a substrate coated on at least one side with a continuous layer of a pressure-sensitive adhesive having a microstructured surface, wherein the microstructured surface comprises a series of features and wherein the lateral aspect ratio of the features range from about 0.1 to about 10.

2. The coated substrate of claim 1 wherein each of the features has a shape selected from the group consisting of hemispheres, prisms, pyramids, ellipses, and grooves.

3. The coated substrate of claim 1 wherein the substrate is selected from the group consisting of backings and release liners.

4. The coated substrate of claim 1 wherein the lateral aspect ratio of the features range from about 0.2 to about 5.

5. The coated substrate of claim 1 wherein the spacing aspect ratio of the features range from about 1 to about 1.9.

6. The coated substrate of claim 1 wherein the spacing aspect ratio of the features ranges from about 1 to about 1.5.

7. The coated substrate of claim 1 wherein the spacing aspect ratio of the features ranges from about 1 to about 1.1

8. The coated substrate of claim 1 wherein the pressure-sensitive adhesive comprises a thermoplastic block copolymer adhesive.

9. The coated substrate of claim 8 wherein the thermoplastic block copolymer adhesive is selected from the group consisting of styrene-isoprene-styrene, styrene-butadiene-styrene, and styrene-ethylene/butylene-styrene block copolymers.

10. The coated substrate of claim 1 wherein the pressure-sensitive adhesive comprises an acrylic polymeric pressure-sensitive adhesive modified with a polymeric segment(s) having glass transition temperature(s) higher than about 20° C.

11. The coated substrate of claim 1 wherein said backing is selected from the group consisting of poly(propylene), poly(ethylene), poly(vinyl chloride), polyester, polyamide, cellulose acetate, ethyl cellulose, woven fabric, nonwoven fabric, metal, metallized polymeric film, and ceramic sheet materials.

12. The coated substrate of claim 1 wherein each feature has a height of about 2.5 to about 375 micrometers.

13. The coated substrate of claim 1 wherein each feature has a height of about 25 to about 250 micrometers.

14. The coated substrate of claim 1 wherein each feature has a height of about 25 to about 125 micrometers.

15. The coated substrate of claim 1 wherein three dimensions of each feature are microscopic.

16. The coated substrate of claim 1 wherein the pressure-sensitive adhesive comprises a radiation curable acrylate pressure-sensitive adhesive.

17. The coated substrate of claim 1 wherein the pressure-sensitive adhesive is a temporarily repositionable adhesive.

18. The coated substrate of claim 1 wherein the pressure-sensitive adhesive is a permanently repositionable adhesive.

19. The coated substrate of claim 1 wherein the pressure-sensitive adhesive is a self-debonding adhesive.

20. The coated substrate of claim 1 where the pressure-sensitive adhesive is selected from the group consisting of organic solvent based acrylics, waterborne acrylics, silicone adhesives, natural rubber based adhesives, and thermoplastic resin based adhesives.

* * * * *

UNITED STATES PATENT AND TRADEMARK OFFICE
CERTIFICATE OF CORRECTION

PATENT NO. : 6,838,150 B2
DATED : January 4, 2005
INVENTOR(S) : Mazurek, Mieczyslaw H.

It is certified that error appears in the above-identified patent and that said Letters Patent is hereby corrected as shown below:

Column 3,
Line 30, after "of" delete ",".
Line 38, delete "Theological" and insert -- rheological --, therefor.

Column 7,
Line 19, delete "Theological" and insert -- rheological --, therefor.

Column 17,
Line 51, after "glass" insert -- test --.

Column 28,
Line 49, delete "where" and insert -- wherein -- therefor.

Signed and Sealed this

Seventeenth Day of May, 2005

JON W. DUDAS
*Director of the United States Patent and Trademark Office*